United States Patent [19]

Uthoff et al.

[11] Patent Number: 4,850,322

[45] Date of Patent: Jul. 25, 1989

[54] METHOD AND APPARATUS FOR POSITIONING A TORQUE MOTOR ARMATURE

[75] Inventors: Loren H. Uthoff, Canton; Robert J. Mohan, Madison Heights, both of Mich.

[73] Assignee: Eaton Corporation, Cleveland, Ohio

[21] Appl. No.: 175,969

[22] Filed: Mar. 31, 1988

[51] Int. Cl.⁴ .................. F02D 11/10; H02K 15/02
[52] U.S. Cl. .......................... 123/399; 29/598; 310/42
[58] Field of Search ................ 123/361, 399; 251/129.11; 310/42, 191, 209, 268; 29/596, 598

[56] References Cited

U.S. PATENT DOCUMENTS

| | | | |
|---|---|---|---|
| 4,199,861 | 4/1980 | Buckman et al. | 310/42 X |
| 4,496,134 | 1/1985 | Idogaki et al. | 251/65 |
| 4,541,378 | 9/1985 | Kitamura | 123/333 |
| 4,549,517 | 10/1985 | Kamiyama | 123/478 |
| 4,601,271 | 7/1986 | Eijiri et al. | 123/361 |

*Primary Examiner*—Tony M. Argenbright
*Attorney, Agent, or Firm*—J. G. Lewis

[57] ABSTRACT

A torque motor and throttle body are integrated within a single assembly for application with an internal combustion engine charge air inlet. The butterfly valving element of the throttle body and rotor of the motor are mounted on a common shaft, the position of which is established by a fly-by-wire control circuit. The rotor is selectively affixed to the shaft through an intermediate coupling which is excessible externally of the motor's closed stator assembly.

38 Claims, 4 Drawing Sheets

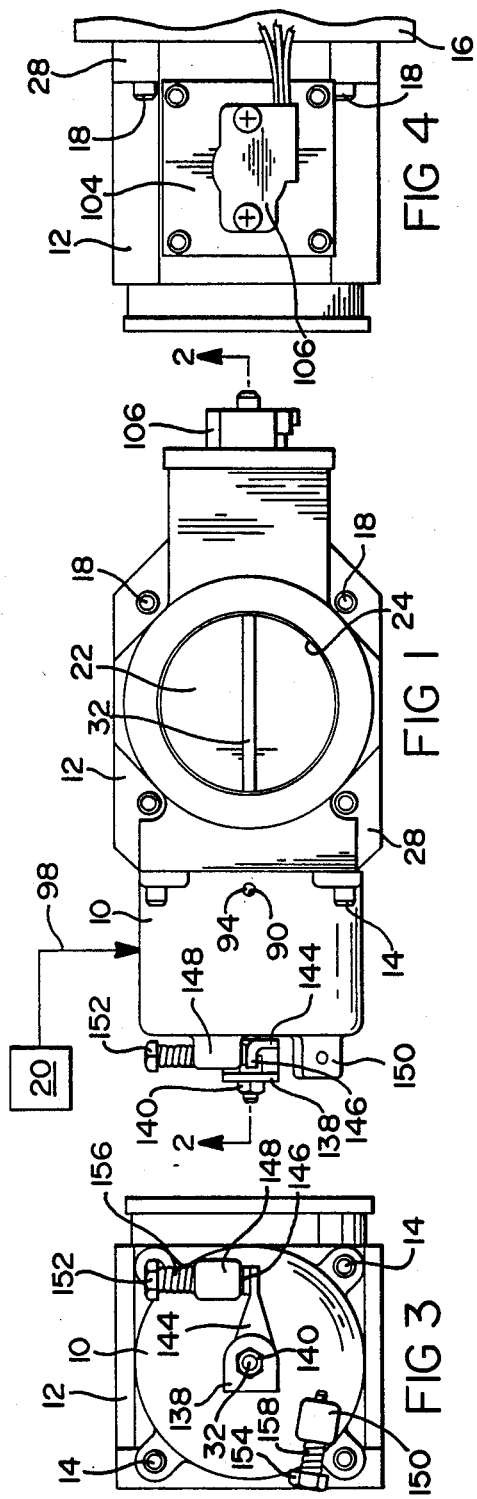
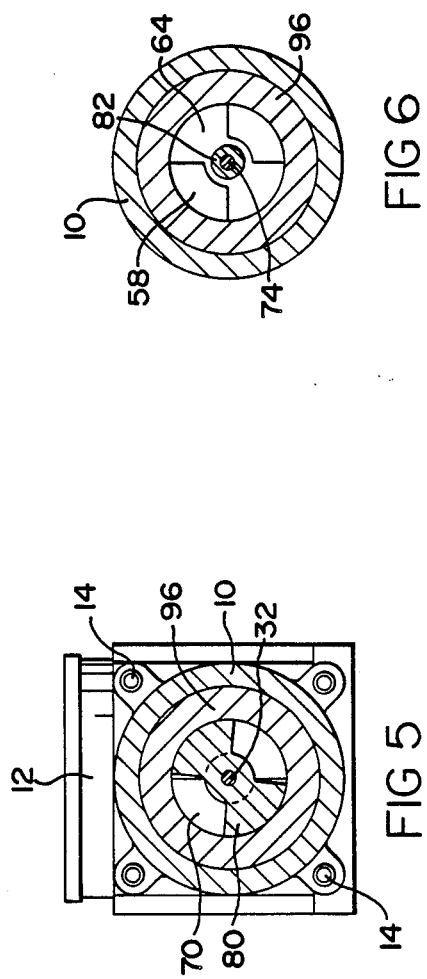

AXIAL FORCE VS ARMATURE POSITION

METHOD AND APPARATUS FOR POSITIONING A TORQUE MOTOR ARMATURE

INTRODUCTION

The present invention relates to an apparatus and methodology for precision assembly of a torque motor for use in a device which electrically controls the opening degree of a throttle valve of an internal combustion engine for a motor vehicle.

CROSS REFERENCE

The subject matter of this invention is related to that of U.S. application No. 177,714 filed on Apr. 5, 1988, entitled "Closed Current Control for Torque Motor" by A. Gale and J. Slicker.

BACKGROUND OF THE INVENTION

The application of various types of torque motors to control a throttle or valving element in the air intake passage of an internal combustion engine is well known. More recently, so called "fly-by-wire" systems have been proposed which totally eliminate mechanical linkage between the operator's accelerator pedal and the engine throttle body, providing, in its place, a torque motor which operates to position a throttle valve shaft in response to an electrical operator demand signal.

Such arrangements typically employ a motor and throttle valve as separate elements, wherein an output shaft of the motor is connected to a throttle valve through a coupling, and wherein the degree of opening of the throttle valve is modulated in accordance with rotational displacement of the output shaft of the motor. Such arrangements have not received wide commercial acceptance, however. The provision of structure between the motor and throttle body tends to proliferate part count and unit cost as well as requires a large space in the engine compartment of the host vehicle. Additionally, the use of separate motor/throttle valve structures raise the possibility of certain failure modes in which torque transmission from the output shaft fails to appropriately position the throttle valve shaft such as through binding and the like.

The above described shortcomings of the prior art have been, in part, recognized and apparatus suggested incorporating a motor rotor and throttle valve plate mounted on a common shaft. Such an arrangement is described in U.S. Pat. No. 4,601,271 to Ejiri et al. Such structure provides for simplified design, reduced part count and compact packaging of a single integrated device.

The application of such devices as a prime throttle control for an internal combustion engine of an automobile requires a high degree of reliability and responsiveness to varying operator and system input signals. Accordingly, the motor must be sized to provide extremely fast response to input signal changes over a sustained period of time and in an extremely hostile environment involving large temperature gradients, contamination and corrosive atmosphere. Although, the motor must have substantial electromagnetic "muscle" to provide appropriate response time, mass of the rotating elements must be held to a minimum to prevent inertia induced overshoot requiring damping or other response degrading add-ons to the design.

One way to effect enhanced motor response while minimizing mass of rotating elements is to reduce the working gaps in the magnetic circuit of the motor. This is accomplished through precision manufacturing techniques not generally employed in the automotive industry. Furthermore, the integration of a motor and throttle body in a single assembly can cause additional tolerance stack up as well as reduced reliability and unit to unit repeatability. Finally, integrated designs such as described in U.S. Pat. No. 4,601,271 make post assembly calibration of the various operating elements difficult and commercially unfeasible.

It will be apparent from a reading of the specification that the present invention may be advantageously utilized with various types of associated loads for may different application. However, the invention is especially useful when used in combination with a throttle body for controlling the air inlet passage to an internal combustion engine, and will be described in connection therewith.

BRIEF DESCRIPTION OF THE INVENTION

The present invention is embodied in an integrated device for providing throttle control for an internal combustion engine and overcomes the shortcomings of the prior art described herein above. The device includes a motor having a stator assembly defining two generally parallel spaced pole faces, an output shaft which engages a load element such as a throttle blade disposed for rotation in the throat of an associate throttle valve, an armature which is carried with the shaft for rotational displacement adjacent to the pole faces in response to a control signal and externally accessable coupling means operable to selectively position the armature in a fixed relationship with the shaft thereby establishing an air gap between the pole and armature. This arrangement has the advantage of permitting post assembly positioning and calibration of the motor armature with respect to the output shaft and stator pole faces.

According to an aspect of the invention, a method of selectively positioning the armature in fixed relationship with the output shaft of the motor includes the steps of rigidly affixing the armature to an elongated coupling member, concentrically positioning the member and armature on the shaft for relative displacement, placing the member, armature and shaft is assembly with a substantially closed motor stator with the mixture partially interspacing opposed pole faces within the stator for electromagnetic interaction therewith and the coupling and shaft extending axially beyond the point external of the stator. limiting axial freedom of displacement of the shaft, manipulating the coupling member as selectively position the armature between the pole faces and, affixing the coupling and shaft at said external axial point whereinafter the member, armature and shaft rotate in unison. This arrangement has the advantage of providing precise unit to unit calibration and precision alignment of the motor after integrated assembly with a mechanical load effectuating an axial clearance check is complete.

According to another aspect of the invention, the above described method further includes the step of electrically energizing the motor induction coil used for effecting electromagnetic interaction between the stator and rotor during the manipulation of the coupling member. This step has the advantage of positioning the rotor between the pole faces so that the magnetically imposed axial forces between each pole and the armature are substantially offsetting thereby minimizing motor secondary forces.

According to another aspect of the invention, the above described method further includes rotating the armature until the range of usuable motor torque is established after which the armature is affixed to the shaft with proper orientation of the throttle plate(s) for the required range of rotation.

According to another aspect of the invention, means are provided to limit axial freedom of movement of the shaft with respect to the stator assembly independent of said coupling means. This arrangement has the advantage of ensuring axial stability between the shaft and stator assembly during positioning of the armature.

According to another aspect of the invention, means external to the stator assembly are provided to define rotational stop limits to the shaft, coupling and armature assembly.

According to another aspect of the invention, the above described rotational limiting means are selectively repositionable. This arrangement has the advantage of enabling after assembly (re)calibration.

According to another aspect of the invention, the output shaft extends substantially through the throttle valve intake passage and carries the valving element for rotational displacement in unison with the armature. The output shaft is journalled to the intake passage defining structure through two axially opposed bearings straddling the intake passage. This arrangement has the advantage of permitting an inexpensive two bearing integrated design.

According to still another aspect of the invention, the output shaft extends in at least one axial direction from the bearings and is substantially centilevered therefrom whereby the extending portion is otherwise substantially unsupported and the armature and coupling is carried by said unsupported portion. This arrangement has the advantage of providing a centilevered construction of the motor assembly on the throttle valve permitting precise after assembly calibration.

According to still another aspect of the invention, the diameter of the shaft is reduced so as to reduce weight, expense and airflow restriction and a third support bearing is used at the outside face of the torque motor for support.

These and other features and advantages of this invention will become apparent upon reading the following specification, which, along with the drawings, describes and discloses a preferred embodiment of the invention in detail.

The detailed description of the disclosed embodiment makes reference to the accompanying drawings.

BRIEF DESCRIPTION OF THE DRAWINGS

FIG. 1 is a top plan view of the preferred embodiment of the invention;

FIG. 3, is a left end plan view of the embodiment of FIG. 1;

FIG. 4, is a right end plan view of the embodiment of FIG. 1, illustrating its mounting on an internal combustion engine;

FIG. 5, is a sectional view taken on lines 5—5 of FIG. 2;

FIG. 6, is a sectional view taken on lines 6—6 of FIG. 2;

DETAILED DESCRIPTION OF THE SPECIFIC EMBODIMENT

Figure 2:
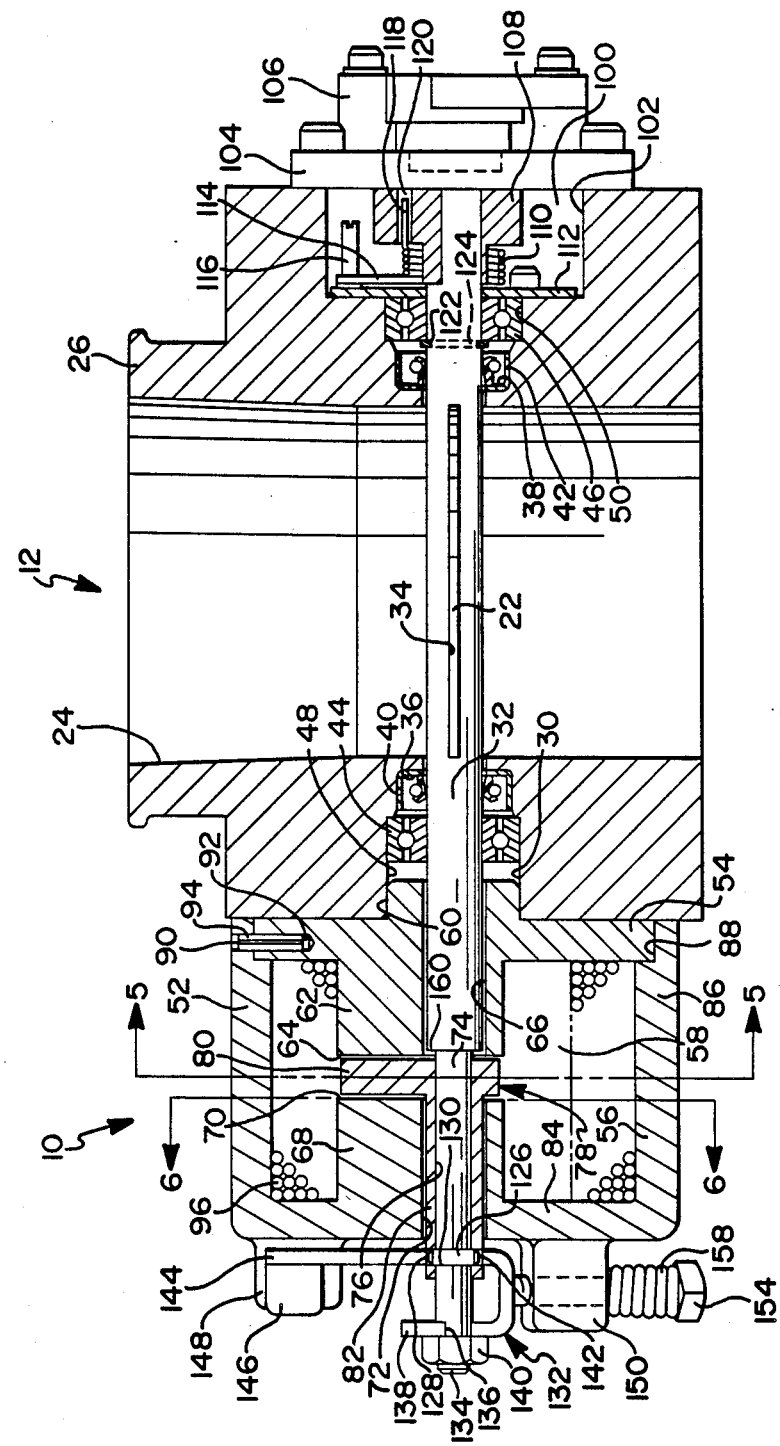
FIG. 2, is a sectional view of the embodiment of the invention taken on lines 2—2 of FIG. 1 on an enlarged scale.

Referring to FIGS. 1, 3 and 4, a torque motor 10 is held in assembly with a throttle body 12 by suitable fasteners such as screws 14. In its intended application, throttle body 12 is mounted for controlling the air charge inlet of an internal combustion engine 16 within a motor vehicle (not illustrated) by screws 18 or other suitable fasteners. Motor 10 is described as a reluctance torque motor operating as a rotary solenoid. However, other types such as stepper, brush type d.c., and permanent magnet torque motors could be substituted.

Motor 10 is electrically energized by a variable d.c. current from a control circuit 20 to selectively position a butterfly valving element 22 disposed within an air inlet passageway 24 in response to operator or vehicle system demand signals generated by control circuit 20. Such a circuit is described in a copending application filed on Apr. 5, 1988 as Ser. No. 177,714 entitled "Closed Current Control for Torque Motor", the specification of which is incorporated herein by reference.

Referring to FIGS. 2, 5 and 6, the internal details of the torque motor 10 and throttle body 12 are illustrated. Throttle body 12 comprises a housing 26 defining through bore 24 and flanges 28 (refer FIGS. 1 and 4) with apertures for receiving screws 18 for mounting to internal combustion engine 16. Housing 26 also defines a stepped through bore 30 extending generally transversely through air inlet passageway 24. An elongated control shaft 32 extends entirely through bore 30 and defines a radially extending through slot 34 generally axially coextensive with passageway 24 for receiving butterfly valving element 22 in a manner well konwn in the art. Shaft 32 and valving element 22 thus serve to rotate between a first position (illustrated) in which element 22 substantially closes passageway 24 and a second position in which the valving element 22 is rotated approximately 80° from its illustrated position where the air inlet passageway 24 is substantially unobstructed. Valving element 22 is a disc precision formed to fit within passageway 24 and extend axially for near line-to-line contact between the outer circumferential portion thereof and the material of housing 26 adjacent bore 30 whereby in assembly, element 22 and shaft 32 are free to rotate between the above described first and second positions but are prevented from axial displacement with respect to throttle body 12 by the continuous interface contact between element 22 and shaft 32.

Bore 30 defines symmetrically opposed first steps 36 and 38 straddling passageway 24. Lip seals 40 and 42 are press fit within bore 30 at steps 36 and 38, respectively, to prevent pressurized fluid within passageway 24 from escaping into bore 30. The outer races of two roller bearings 44 and 46 are press fit within complementary opposed second steps, 48 and 50, respectively, of bore 30 exterior of seals 40 and 42. The inner races of bearings 44 and 46 are press fit over the outer surface of shaft 32 for radial restraint thereof. Shaft 32, thus disposed within bore 30 concentrically with seals 40 and 42 and roller bearings 44 and 46 is free for limited rotational displacement but is otherwise restrained by the balance of the structure of throttle body assembly 12.

Shaft 32 extends leftwardly (as viewed in FIG. 2), emerging from bore 30 and passes through torque motor 10. Motor 10 includes a housing or stator assembly composed of a generally disc shaped base portion 54 and a generally cup shaped cover portion 56 which, when combined in assembly define a substantially closed interior cavity 58. Base portion 54 includes an integral annular boss 60 slip fit within second step 48 of bore 30. An integral bow-tie shaped pole 62 extends leftwardly from base portion 54 terminating in a pole face 64 best seen in FIG. 6. A central bore 66 extends through boss 60 and pole 62 and is axially aligned with bore 30. Bore 66 is dimensioned to loosely receive shaft 32.

Cover portion 56 includes an integrally formed pole 68 extending rightwardly into cavity 58, terminating in a second pole face 70. Pole 68 is generally bow-tie shaped complementarily with pole 62 and is rotationally positioned to be in register therewith as is best viewed in FIG. 5. A bore 72 extends through pole 68 and is in axial alignment with bores 66 and 30. The left-handmost end of shaft 32 has a portion of reduced diameter 74 which is slip fit through an axial bore 76 formed within a rotor 78 disposed within cavity 58. Rotor 78 comprises a generally bow-tie shaped armature portion 80 shaped and dimensioned complementarily with poles 62 and 68. Rotor 78 further includes an elongated tubular coupling portion 82 disposed concentrically with reduced diameter portion 74 of shaft 32 and extending leftwardly from armature 80, exiting cover portion 56 of motor 10 at the left-handmost portion thereof. Armature 80 and coupling 82 are illustrated as being integrally formed. However, it is contemplated that rotor 78 could be assembled from discrete elements attached by fasteners, weldments or the like. Rotor 78 thus provides a unitary rigid structure which is slip fit over portion 74 of shaft 32 and restrained thereby from all but axial and rotational displacement. Alternatively, the outer surface of reduced diameter portion 74 and bore 76 of coupling 82 could be provided with complimentary serrations or otherwise keyed to prevent relative rotation while permitting relative freedom of axial displacement.

Rotor 78 is positioned within cavity 58 between pole faces 64 and 70 and is dimensioned for axial clearance therewith whereby rotor 78 is otherwise free for rotational displacement with respect to poles 62 and 68. Likewise, the outer surface of coupling 82 is dimensioned slightly smaller than bore 72 for a relatively loose interfit. The assembly of rotor 78 and shaft 32 is essentially supported by roller bearings 40 and 46 with the portion of shaft 32 passing through motor 10 depending from throttle body 12 in cantilever fashion. Likewise, stator assembly 52 is rigidly secured to housing 26 by screws 14 and receives its positioning support exclusively therefrom.

Cover portion 56 of stator assembly 52 includes an annular and portion 84 integrally formed with a cylindrical wall portion 86. The right-handmost end of wall portion 86 has a step 88 formed on the inner surface therein which mates with the outer circumferential portion of base portion 54. Registering radially extending bore 90 and 92 formed in wall portion 86 and base portion 54, respectively, receive a roll pin 94 to rotationally and axially fix base and cover portions 54 and 56 into a single rigid assembly.

An annular inductor or coil 96 is disposed within cavity 58 radially intermediate poles 62 and 68 and wall portion 86. Coil 96 is electrically interconnected to control circuit 20 via interconnecting leads 98 (see FIG. 1) in a manner well known in the art. Shaft 32, rotor 78, base portion 54 and cover portion 56 of motor 10 are formed of mild steel or other suitable ferrous materials. When electrically energized by control circuit 20, coil 96 induces a magnetic circuit within base and cover portions 54 and 56, traversing the gap between pole faces 64 and 70. When a given control signal is received from control circuit 20, coil 96 will establish a corresponding magnetic field intensity within the gap between pole faces 64 and 70 tending to rotate armature 80 into a particular angular position.

The right-hand end of shaft 32 extends into a cavity 100 formed in housing 26 by a third step 102 in bore 30. Cavity 100 is closed by a cover member 104 and a shaft position sensor 106, the function of which is described in detail in the above referenced copending application. The right-hand end of shaft 32 carries a flanged boss 108 for rotation therewith and operatively engages sensor 106. A coil spring 110 is disposed within cavity 100. Spring 110 is disposed concentrically with shaft 32 axially intermediate boss 108 and a bearing retention/throttle shaft positioning plate 112. Spring 110 has one end 114 thereof pressing against an axially extending abutment pin 116 threadably engaged within housing 26. Spring 110 has the other end 118 thereof extending into an axially directed bore 120 within flanged boss 108. Spring 110 thus tends to bias shaft 32 and valving element 22 into the closed (illustrated) position.

A snap ring 122 is received within a radially outwardly opening annular groove 124 in an abutting relationship with the inner race of roller bearing 46 to coact with positioning plate 112 in limiting axial displacement of shaft 32 in both axial directions with respect to housing 26.

Portion 74 of shaft 32 and coupling 82 extend leftwardly of cover portion 56 and are joined at a point externally accessible of motor 10 by a pin 126 extending radially through registering bores 128 and 130 in coupling 82 and shaft portion 74, respectively. Pin 126 serves to axially and rotationally position rotor 78 upon shaft 32 whereby when an actuation signal is received from control circuit 20, armature 80 is rotationally urged into the space between pole faces 64 and 70 by variations in the magnetic field therebetween against the biasing effect of spring 110. For a given control signal, armature 80 will assume a fix angular position between pole faces 64 and 70 and thereby set the position of valving element 22 for modulation of the air flow to the host internal combustion engine 16.

When the control signal is reduced or terminated, spring 110 will tend to bias shaft 32 and valving element 22 into the illustrated closed position wherein armature 80 is rotated nearly out of register with pole faces 64 and 70, as can best be seen in FIG. 5.

Referring to FIGS. 1 through 3, motor 10 includes an adjustable rotor stop mechanism. Shaft portion 74 extends rightwardly beyond its point of attachment to rotor 78 via pin 126. A generally U-shaped member 132 is carried by shaft portion 74. The left-handmost end of shaft portion 74 has a flat 134 formed therein which receives a D-shaped aperture 136 in a short leg 138 of member 132 for retention in the illustrated position by a lock nut 140. Coupling 82 and shaft portion 74 extend through an axially aligned bore 142 formed in a long leg 144 of member 132. Member 132 is dimensioned whereby long leg 144 overlays bores 128 and 130, thereby preventing pin 126 from becoming dislodged. Long leg 144 of member 132 terminates in a leftwardly extending abutment portion 146. Two leftwardly extending bosses 148 and 150 are integrally formed in annular end portion 84 of motor cover portion 56. Bosses 148 and 150 are radially positioned with respect to the axis of rotation of shaft 32 whereby the respective ends of adjustment bolts 152 and 154 which are threadably engaged with and pass through bosses 148 and 150, respectively, are in rotational alignment with abutment portion 146 of member 132 and define its limits of travel. Bolts 152 and 154 carry springs 156 and 158, respectively, as vibration dampers. Bosses 148 and 150 are circumferentially spaced to define a suitable limit of travel for valving element 22. Bolts 152 and 154 provide a fine adjustment or calibration.

Figure 7:
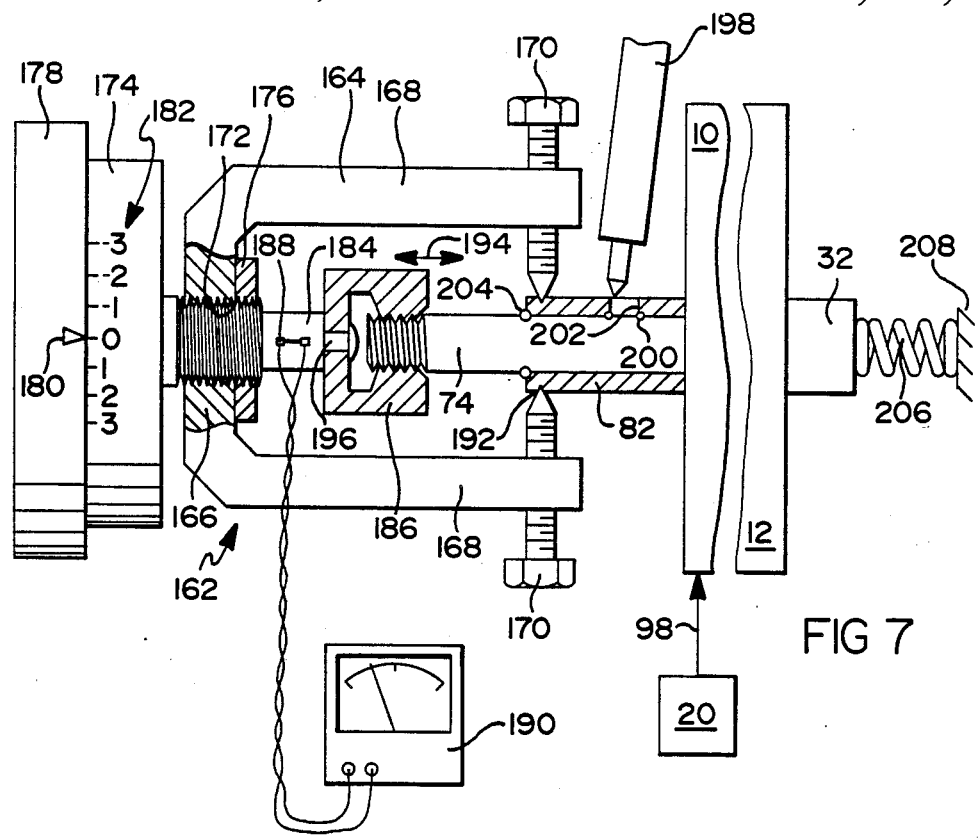
FIG. 7, is a fragmented sectional view of a portion of the embodiment of FIG. 2 on an enlarged scale and including an armature positioning fixture.
Figure 8:
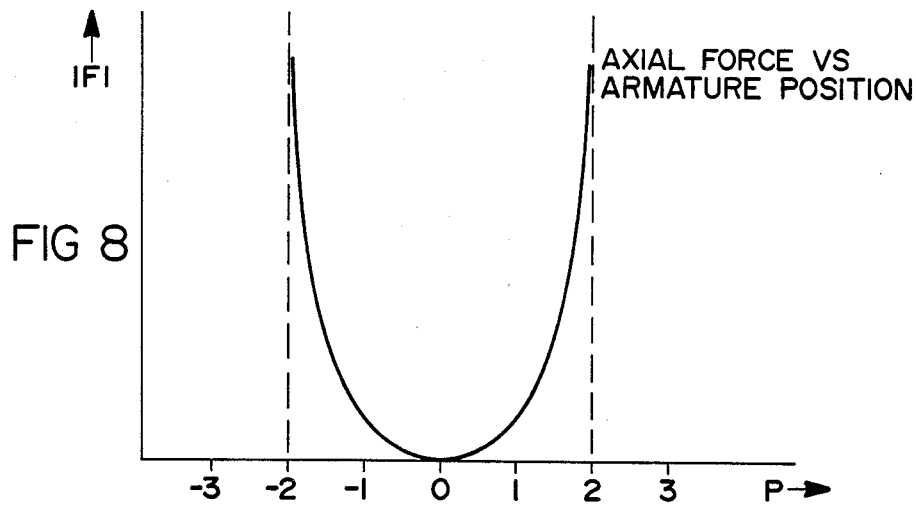
FIG. 8, is a typical axial force vs armature position characteristic measured by the apparatus on FIG. 7.

Referring to FIGS. 2, 7 and 8, a preferred and an alternative method of precisely aligning and positioning rotor 78 with respect to stator 52 is described. As was described hereinabove, upon initial assembly, rotor 78 is carried upon shaft 32 but is otherwise free for relative rotation and axial displacement thereupon. Armature 80 axial freedom of movement is limited by poles 62 and 68. A step 160 transitioning shaft 32 into reduced diameter portion 74 is disposed rightwardly of pole face 64. The outer diameter of coupling 82 is dimensioned nearly identically with that of the portion of shaft 32 extending through bore 66. Likewise, bores 66 and 72 are dimensioned identically. Although the portion of shaft 32 extending leftwardly of bearing 44 and rotor 78 are illustrated and described as being slip fit within bores 66 and 72, it is contemplated that additional sleeve or roller bearings could be provided intermediate stator assembly 52 and armature 80/shaft 32 if additional radial support were desired. Furthermore, it is further contemplated that a seal could be provided at the opening of bore 72 to prevent external airborne contaminants from entering stator assembly 52.

Figure 10:
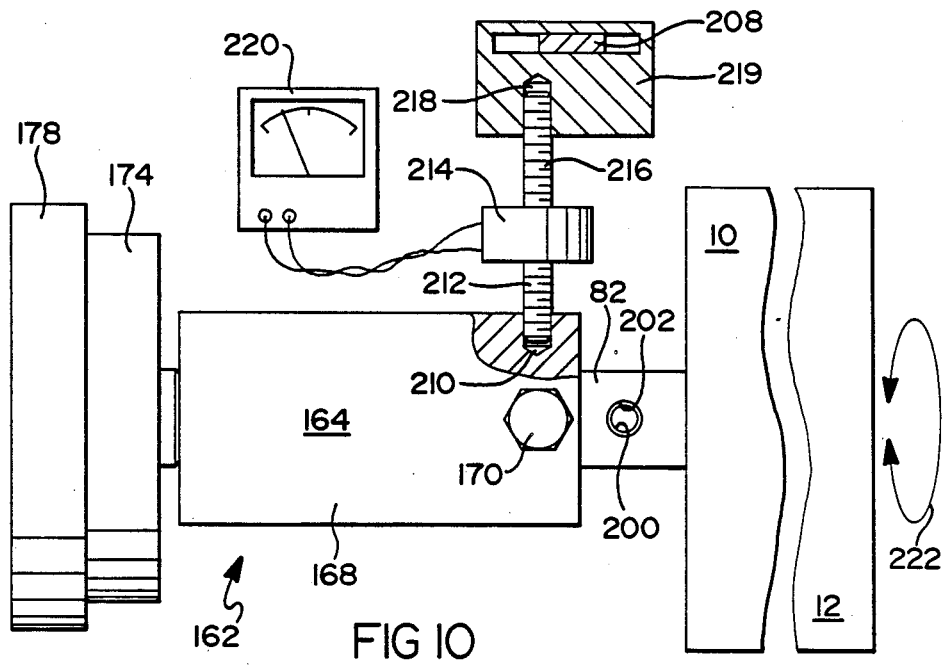
FIG. 10, is a top view of the armature positioning fixture of FIG. 7.

FIGS. 7 & 10, illustrate an armature positioning fixture 162 employed in post assembly alignment and positioning of rotor 78 with respect to stator assembly 52 and shaft 32. Fixture 162 includes a generally U-shaped frame 164 including a hub portion 166 and two generally parallel arm portions 168. The free ends of arms 169 threadably receive axially aligned inwardly directed clamping screws 170. Hub portion 166 defines a bore 172 for threadably receiving a vernier caliper 174 or other suitable precision linear measurement device. Caliper 174 is fixed with respect to frame 164 by a lock nut 176 and includes an adjustment knob 178 with a position marker 180 for rotation adjacent a calibration scale 182 on the fixed portion of caliper 174. A probe 184 extends from caliper 174 terminating in a clevis or threaded bushing 186 suitable for engaging the threaded end of shaft portion 74. Probe 184 is equipped with a strain gauge 188 and instrumentation 190 suitable to provide a readout of axial force within probe 184. The upper arm 168 (as viewed in FIG. 7) has a blind bore 210 formed therein threadably receiving one mounting stud 212 of a linear force transducer 214. The remaining mounting stud 216 of transducer 214 is threadably received in a blind bore 218 formed in a sliding block 219 which is restricted from all but limited axial displacement by grounded member 208. Transducer 214 is axially offset from the rotational axis of coupling portion 82 and tangentially oriented to measure the output torque of motor 10 via suitable instrumentation 220.

Coupling 82 is aligned and fixed to shaft portion 74 by positioning fixture 162 with probe 184 in axial alignment with shaft 32 and threadably engaging collar 186 with the left-handmost end of shaft portion 74. Frame 164 is then rigidly affixed to coupling 82 by advancing screws 170 until they engage a V-notch 192 formed in the end of coupling 82. Adjustment knob 178 is then rotated to determine the degree of axial freedom between coupling 82 and shaft portion 74 by moving probe 184 axially as indicated by arrow 194. Assume, for example, that knob 178 is turned clockwise, advancing probe 184 rightwardly until the left-hand face of armature 80 (as viewed in FIG. 2) contacts pole face 70. At that point, assume marker 180 has advanced to the +2 calibration mark. Knob 178 is then rotated counterclockwise to retract probe 184 inwardly or leftwardly as viewed in FIG. 7, thereby displacing rotor 78 rightwardly until the right-hand surface of armature 80 contacts pole face 64. At this point, marker 180 would provide another reading, for example −2. Accordingly, a range of +2 to −2 has been established corresponding with the total axial freedom of movement of armature 80 between pole faces 64 and 70.

Armature 80 is thereafter centered between pole faces 64 and 70 by turning knob 178 until marker 180 is midway between the travel limits or zero on calibration scale 182 assuring that armature 80 is positioned midway between pole faces 64 and 70.

Coil 96 is then energized by control circuit 20. A slip fitting 196 between threaded collar 186 and probe 184 insures that coupling 82 still has rotational freedom displacement with respect to shaft 32. Because rotor 78 is not yet connected to a load, the magnetic field between poles 62 and 68 will rotate armature 80 from its position indicated in FIG. 5 into full registry with poles 62 and 68. Valving element 22 and shaft 32 are then manually rotated to the fully open position wherein inlet passageway 24 is unobstructed. At that point precise rotational and axial positioning of rotor 78 has been achieved and rotor 78 is then fixed to shaft portion 74. Such fixing can be effected by drilling bores 128 and 130 and inserting pin 126 or, alternatively, by welding by such as a gas tungsten arc welder 198 which establishes a weldment 200 at the bottom of a preformed pilot bore 202 in coupling 82 at a point adjacent shaft portion 74. After weldment 200 is establishment, fixture 162 can be removed and assembly is complete. It may prove desirable, however, to provide an additional annular weldment 204 between the left-handmost end of coupling 82 and shaft portion 74.

The actual type of fixing coupling 82 to shaft portion 74 will vary depending upon the intended application wherein the tacking method of weldment 200 may in and of itself provide suitable retention. It should be apparent to one of ordinary skill in the art in view of this specification that numerous alternative fastening approaches could be employed. It is critical however, that precise alignment be maintained throughout the process.

Because some tolerance variations are inevitable in any manufacturing process, an axial play, i.e. limiited freedom between shaft 32 and throttle body 12 will result therefrom. It is desirable, therefore, to also ensure the axial position of shaft 32 with respect to housing 26 prior to conducting the above described positioning and fixing of rotor 78. This is most easily accomplished by a spring 206 or the like bearing between shaft 32 and a grounded member 208 to bias shaft 32 axially toward one or the other limits of travel. Alternatively, a second fixture akin to positioning fixture 162 could be employed to determine and position shaft 32 into its center of axial freedom prior to performing the above described method.

An additional step in positioning rotor 78 with respect to shaft portion 74 can be taken by first mechanically positioning armature 80 intermediate pole faces 64 and 70 as described above and then readjust or fine tune the final positioning by reference to instrumentation 190. Referring to FIG. 8, when armature 80 is precisely positioned between pole faces 64 and 70, the axial force read by strain gauge 188 will null at the point when the magnetic attractive forces tending to pull armature 80 toward poles 62 and 68 offset one another. This method has been found to provide precision alignment and unit-to-unit repeatability heretofore unknown in a cost competitive design.

Figure 9:
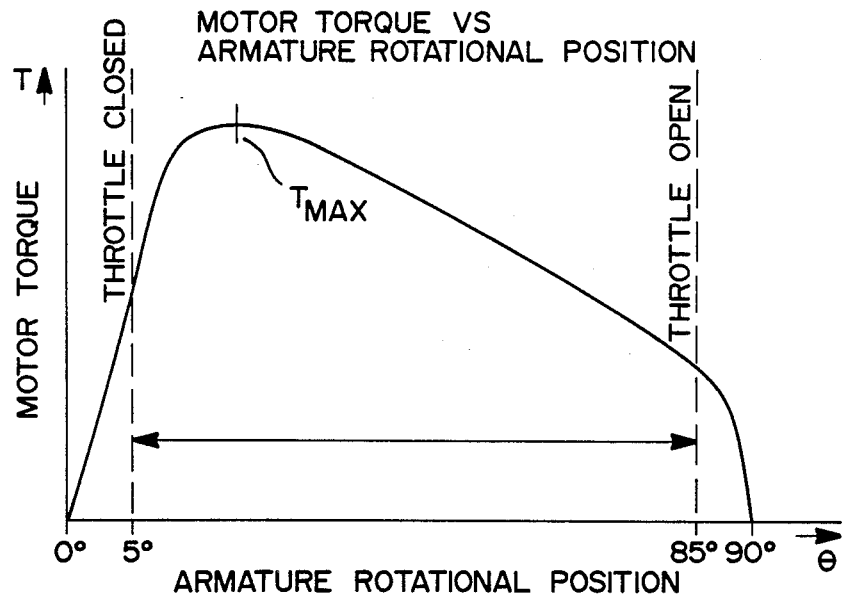
FIG. 9, is a typical motor rotational torque vs armature position characteristic as measured by the apparatus on FIG. 7.

Referring to FIGS. 9 and 10, a further option resides in the rotational positioning of rotor 78 at a point of maximum motor torque, $T_{max}$ by energizing motor 10 and manipulating stator assembly 52 by rotating it about the rotor 78 axis of rotation, as indicated by arrow 222, to establish the maximum developed torque point on the characteristic of FIG. 9. Axial positioning and affixing of stator 52 is then accomplished as described hereinabove. This step ensures that the point of maximum allignment precision will correlate with the point of maximum motor torque.

It is to be understood that the invention has been described with reference to a specific embodiment and variations to provide the features and advantages previously described and that such embodiment is susceptible of modification such as will be apparent to those skilled in the art. For example, in the broadest sense of the present invention the portion of shaft 32 extending through torque motor 10 can be axially offset from the portion of shaft 32 extending through the load or throttle body 12, the two being suitably coupled as is well known in the art. Furthermore, coupling 82 could extend rightwardly as viewed in FIG. 2 and be joined to shaft 32 at a point intermediate torque motor 10 and its load or throttle body 12. In the broadest sens, "extending externally" is to be interpreted as meaning extending to a point which is externally accessible after stator assembly 52 is essentially complete and armature 80 is enclosed therein. For example, it is contemplated that tools could be provided to reach into a recess within stator assembly 52 for positioning and fixing coupling 82 with respect to shaft 32. Accordingly, the foregoing is not to be construed in a limiting sense.

What is claimed is:

1. An improved motor of the type including a stator assembly defining two generally parallel spaced pole faces, an output shaft operatively engaging a load element for rotation therewith and, an armature carried with said shaft for rotational displacement adjacent said pole faces in response to a control signal, said improvement comprising:
coupling means extending externally of said stator assembly operative to selectively position said armature in a fixed relationship with said shaft.

2. The motor of claim 1, wherein said motor further comprises means operative to limit axial freedom of movement of said shaft with respect to said stator assembly.

3. The motor of claim 2, wherein said coupling means is operative to effect selective axial placement of said armature independent of said shaft axial movement limiting areas.

4. The motor of claim 2, wherein said coupling means and shaft axial movement limiting means coact to axially fixedly position said armature intermediate said pole faces.

5. The motor of claim 1, wherein said stator assembly is substantially closed.

6. The motor of claim 1, further comprising means operative to limit rotational freedom of said shaft and armature.

7. The motor of claim 6, wherein said rotational limiting means comprise first and second end of rotation limit stops.

8. The motor of claim 7, wherein said limit stops are rotatively repositionable.

9. The motor of claim 1, wherein said load element and armature are disposed for coaxial displacement.

10. The motor of claim 9, wherein said output shaft comprises a single elongated shaft member for carrying said load element and armature.

11. The motor of claim 1, wherein said load element comprises a valving element for a throttle control device for an internal combustion engine.

12. The motor of claim 1, wherein said coupling means comprises an elongated sleeve carried concentrically by said shaft, said sleeve including a first portion affixed to said armature and a second portion selectively joined to said shaft at a location axially displaced from said armature.

13. The motor of claim 10, wherein said shaft includes a portion extending axially externally of said stator assembly affixed to said second sleeve portion.

14. An improved motor of the type including a stator assembly defining two generally parallel spaced pole faces, an output shaft disposed for rotation about an axis operatively engaging a load element for displacement therewith, an inductor operative to establish a magnetic field between said pole faces having a characteristic intensity varying as a function of a control signal applied to said inductor, and an armature carried with said shaft for selective rotational displacement between said pole faces in response to variations in said magnetic field intensity, said improvement comprising:
coupling means extending in part externally of said stator assembly operative to selectively position said armature in a fixed relationship with said shaft.

15. An improved motor of the type including a substantially closed stator assembly defining two generally parallel spaced pole faces, an output shaft operatively engaging a load element for rotation therewith, an armature disposed substantially internally of said stator assembly, said armature carried by said shaft for rotational displacement adjacent said pole faces in response to a control signal, said improvement comprising:
means operative to limit axial freedom of movement of said shaft with respect to said stator assembly; and
coupling means operative to selectively position said armature in a fixed relationship with said shaft independent of said shaft axial movement limiting means, said coupling means being accessible to means external to said stator assembly to effect said fixed armature/shaft positioning.

16. In combination:
a load including an element disposed for rotational displacement about an axis; and
a motor comprising,
a stator assembly defining two generally parallel spaced pole faces,
an output shaft disposed for rotation about said axis and operatively engaging said load element for rotation therewith,
an armature carried with said shaft for rotation about said axis,
coupling means extending in part externally of said stator assembly operative to selectively position said armature between said pole faces and to fix said armature for rotation in unison with said load element, and
an inductor operative to establish a magnetic field between said pole faces having a characteristic intensity varying as a function of a control signal applied to said inductor and effecting selective rotational displacement of said armature between said pole faces in response to said variations in magnetic field intensity.

17. The combination of claim 16, further comprising means operative to limit freedom of movement of said output shaft in both axial directions with respect to said stator assembly.

18. The combination of claim 17, wherein said coupling means is operative to effect selective axial displacement of said armature independent of said shaft axial movement limiting means.

19. The combination of claim 18, wherein said coupling means and shaft axial movement limiting means coact to axially-fixedly position said armature midway between said pole faces.

20. The combination of claim 17, wherein said pole faces are axially spaced.

21. The combination of claim 17, wherein said coupling means is operative to selectively axially position said armature with respect to said output shaft.

22. The combination of claim 17, wherein said coupling means is operative to selectively rotationally position said armature with respect to said output shaft.

23. The combination of claim 1, wherein said load comprises a housing fixed with respect to said stator assembly.

24. The combination of claim 23, wherein said stator assembly is carried by said load housing.

25. The combination of claim 24, wherein said motor is a step motor.

26. The combination of claim 25, wherein said motor is a reluctance torque motor.

27. A throttle control device for an internal combustion engine comprising:
means defining an air intake passage;
a valving element disposed for rotational displacement about an axis within said intake passage to effect modulation of air flowing therethrough;
a throttle valve driving motor including a housing assembly fixed with respect to said intake passage defining means and including a stator defining two generally parallel spaced pole faces, an output shaft operatively engaging said valving element for rotation therewith, an armature carried with said shaft for rotational displacement adjacent said pole faces in response to a throttle command signal and coupling means extending externally of said housing assembly operative to selectively position said armature in a fixed relationship with said shaft.

28. The throttle control device of claim 27, wherein said output shaft extends substantially through said intake passage and carries said valving element for rotational displacement in unison with said armature between a first position in which said air intake passage is substantially closed and a second position in which said air intake passage is substantially unobstructed in response to said throttle command signal.

29. The throttle control device of claim 28, further comprising means operative to bias said output shaft toward said first position.

30. The throttle command device of claim 28, wherein said output shaft is journalled to said intake passage defining means through first and second axially opposite bearing means straddling said intake passage.

31. The throttle command device of claim 30, wherein said output shaft extends in at least one axial direction from said first and second bearing means and is substantially cantilevered therefrom, whereby said extending portion is substantially radially unsupported.

32. The throttle control device of claim 31, wherein said armature is carried with said extending output shaft portion.

33. The throttle control device of claim 31, wherein said output shaft extending portion further extends through said stator assembly and said coupling means is fixed to said extending portion at an axial location distant said first and second bearing means.

34. A method of selectively positioning a motor armature in a fixed relationship with an output shaft of said motor, said method comprising the steps of:
rigidly affixing an elongated coupling member to said armature;
concentrically positioning said member and armature on said shaft for relative displacement;
placing said member, armature and shaft in assembly with a substantially closed motor stator, said armature partially interspacing opposed pole faces within said stator for electromagnetic interaction therewith, said coupling and shaft extending axially beyond a point external of said stator;
limiting axial freedom of displacement of said shaft;
manipulating said coupling member to effect a predetermined positioning of said armature between said pole faces; and
affixing said coupling and shaft at said external axial point.

35. The method of claim 34, further comprising the step of electrically energizing a motor induction coil effecting electromagnetic interaction during said manipulation of said coupling member.

36. The method of claim 34, wherein said manipulating step includes positioning said armature substantially midway between said pole faces.

37. The method of claim 34, wherein said manipulating step includes rotational positioning of the armature relative to the shaft.

38. The method of claim 34, wherein said manipulating steps includes rotationally positioning said armature at an orientation substantially correlating with a characteristic maximum motor torque.

* * * * *